April 19, 1927.
E. R. LINEHAN
1,625,733
VEHICLE SIGNAL
Filed Nov. 16, 1926     2 Sheets-Sheet 1
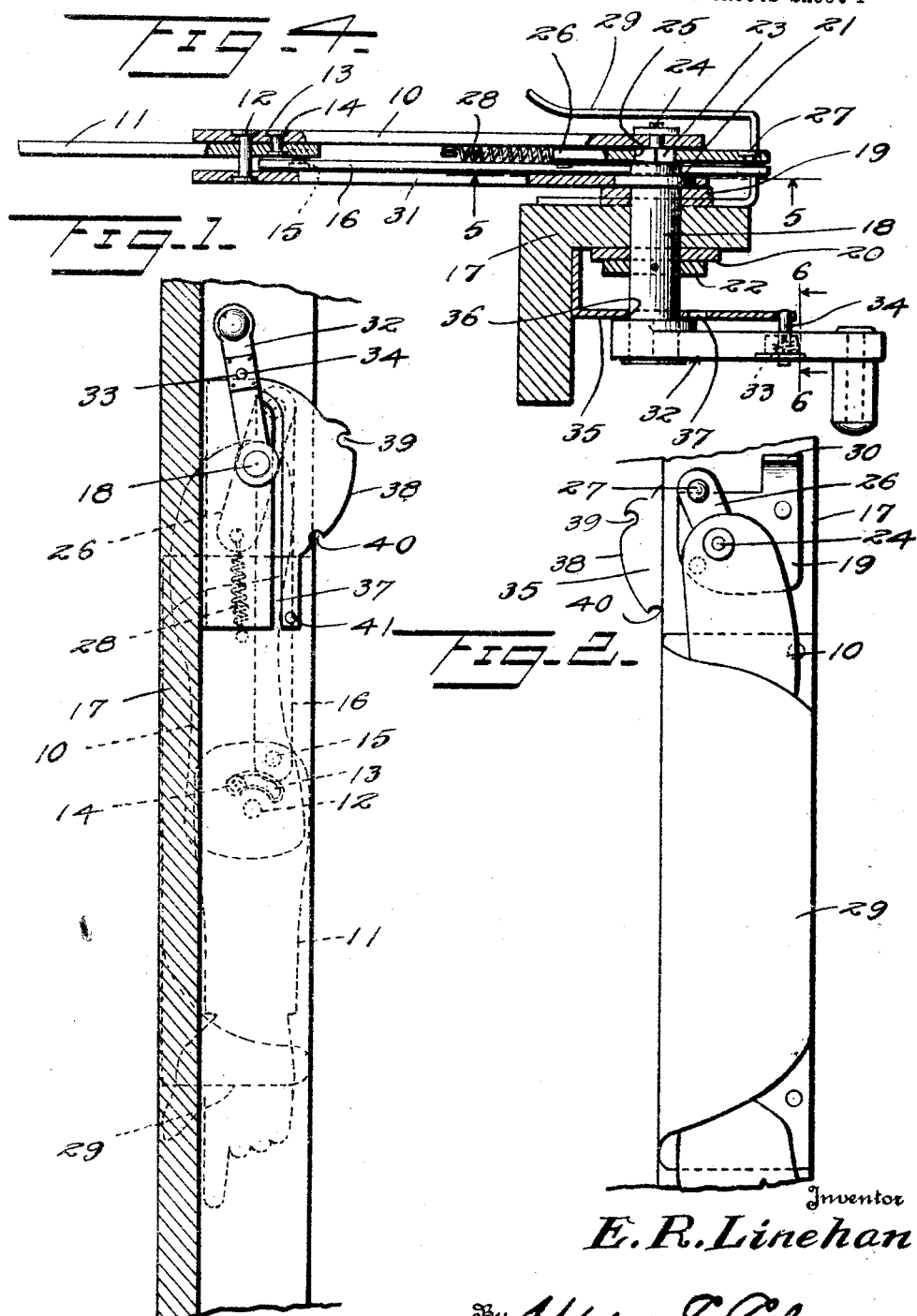
Inventor
E. R. Linehan
By Watson E. Coleman
Attorney April 19, 1927. 1,625,733
E. R. LINEHAN
VEHICLE SIGNAL
Filed Nov. 16, 1926 2 Sheets-Sheet 2
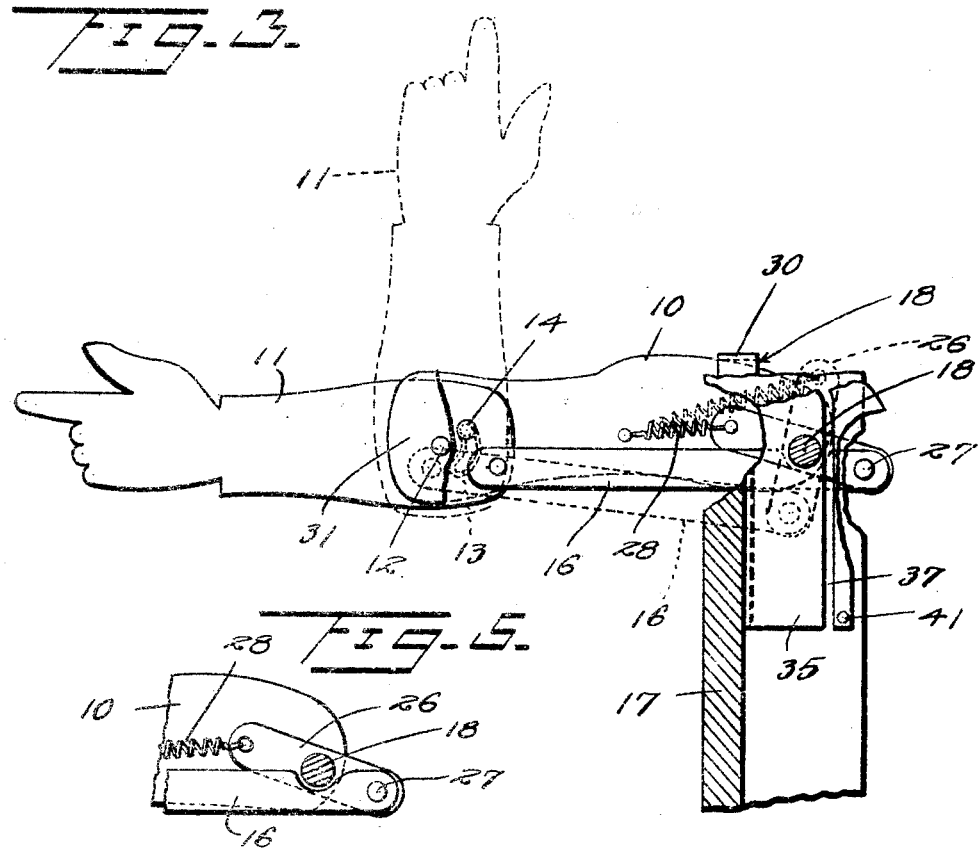
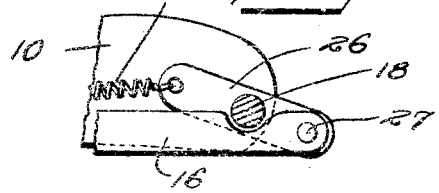
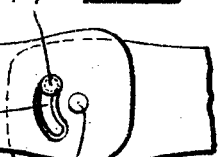
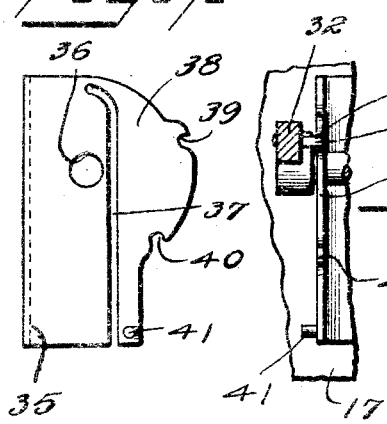
Inventor
E. R. Linehan
By Watson E. Coleman
Attorney Patented Apr. 19, 1927.

1,625,733

UNITED STATES PATENT OFFICE.

EDWIN R. LINEHAN, OF RIVER FALLS, WISCONSIN.

VEHICLE SIGNAL.

Application filed November 16, 1926. Serial No. 148,704.

This invention relates to vehicle signals and more particularly to a signal of the semaphore type and an operating mechanism therefor.

An important object of the invention is to provide a semaphore signal made in the semblance of the human fore and upper arms, together with control means whereby the sections of these arms may be exposed to give a signal while in aligned relation or when disposed at right angles to one another.

A further object of the invention is to provide a device of this character which may be readily and cheaply produced and readily attached to the vehicle.

A still further object of the invention is to provide operating mechanism for a signal of this character so constructed that it is readily controllable by the operator of the vehicle.

These and other objects I attain by the construction shown in the accompanying drawings, wherein for the purpose of illustration is shown a preferred embodiment of my invention and wherein:—

Figure 1 is a sectional view through the body of a vehicle having a signal constructed in accordance with my invention applied thereto;

Figure 2 is a front elevation of the signal;

Figure 3 is a rear elevation partially broken away showing a signal constructed in accordance with my invention applied to a vehicle, the signal being shown in solid lines in the position indicating a left turn and in dotted lines in the position indicating a right turn;

Figure 4 is a sectional view through the signal while in the signalling position shown in solid lines in Figure 3;

Figure 5 is a section on the line 5—5 of Figure 4;

Figure 6 is a section on the line 6—6 of Figure 4;

Figure 7 is a rear elevation of the control bracket;

Figure 8 is a fragmentary front elevation of the joint between the fore and upper arm sections of the signal.

Referring now more particularly to the drawings, the semaphore arm consists of two main sections 10 and 11, hereinafter referred to as the fore and upper arm sections, these sections being connected by a pivot 12, so that they may either be aligned or arranged at right angles to one another. The upper arm section 10 is formed with an arcuate slot 13 concentric with the pivot 12 and the fore arm section has secured thereto a pin 14 operating in this slot. This slot and pin limit the swinging movement of the forearm section to 90°, permitting the arm to swing only from a position where it is aligned with the upper arm section to a position where it is at right angles thereto. At a point 15 spaced from the pivot and lying to one side of the longitudinal axis of the upper arm section, the forearm section has pivoted thereto one end of a link 16. The numeral 17 designates a frame member of the vehicle, preferably a vertical frame member at one side of the windshield. Through this frame member is rotatably directed a pivot bolt 18, washers 19 and 20 being disposed at the front and rear faces of the frame, respectively, and provided with suitable openings through which the bolt may pass. The bolt at the front face of the washer 19 is flanged at 21 to limit its movement through the openings in one direction. To the bolt at the inner face of the washer 20 is secured a collar 22 limiting its movement in the opposite direction. Outwardly of the flange 21, the bolt 18 is provided with an irregularly shaped portion 23, the outer end of which has a reduced axial extension 24 rotatably directed through the upper or shoulder end of the upper arm section 10. The irregularly shaped portion 23 engages in a similarly shaped opening 25 formed centrally with a lever 26, one end of which is pivoted to the opposite end of the link 16 at 27 and the opposite end of which is connected with the upper arm section by a spring 28, which constantly urges the lever 26 to a position where the arm 11 has its pin 14 located at that end of the slot 13 where the sections 10 and 11 are aligned.

It will be obvious that the arm sections will thus be maintained normally in a position where they are aligned and the signal will naturally, by gravity, assume a vertical position. In this vertical position, it is concealed from the view of vehicles approaching from the rear of the vehicle to which it is attached by the frame of the vehicle. I preferably provide a slotted housing 29, which serves to conceal the signal from the view of motorists approaching from the front. If the bolt 18 be rotated, the spring 28 will serve to hold the lever 25 in such a position that the sections 10 and 11 will remain in alignment. If, during such rotation, movement of the section 10 is checked in any manner, the lever 26 will, of course, by its continued rotation, cause the section 11 to rotate about its pivot 12 until the pin 14 comes to the opposite end of the slot 13 and these sections 10 and 11 are at right angles to one another. To provide a check for the motion of the section 10 when this section is horizontally disposed, the washer 19 is provided at its upper end with an outturned flange 30 against which the upper edge of the upper arm section abuts. If the bolt 18 is only rotated a sufficient distance to bring the arm section 10 into engagement with this stop, then the arm section 11 will remain in alignment and will give the signal usually employed for indicating a left hand turn. If the rotation is continued until the forearm 11 is vertically directed, while the upper arm remains horizontally directed, the signal for a right turn is given. A cover plate 31 is preferably provided which is of the same general outline as the upper arm section and is mounted at one end upon the pivot 12 and at its opposite end upon the bolt 18.

The bolt 18 may be rotated and secured in adjusted or signalling position in any suitable manner. In the present instance, the inner end of this bolt is shown as provided with a handle 32. This handle has pivoted thereon a spring-pressed catch element 33 embodying a lug 34 projecting to one side of the handle. To the frame member 17, a plate 35 is secured and this plate is provided with an opening 36 receiving the bolt 18 at a point spaced from the face of the washer 20. The plate 35 is slotted at 37 to produce a resilient tongue, the upper portion of which is arcuately curved at 38 with the axis of the opening 35 as a center. In this arcuately curved portion, notches 39 and 40 are formed to receive the catch lug 34 when the signal is in the left and right turn signalling positions, respectively. The lower end of this tongue is provided with a button 41 which may be pressed to deflect the tongue and release it from engagement with the lug when it is desired to return the signal to normal or inoperative position.

It will be obvious that the construction hereinbefore set forth is capable of a certain range of change and modification without materially departing from the spirit of the invention and I accordingly do not limit myself to such specific structure except as hereinafter claimed.

I claim:—

1. A signal of the type described comprising an arm formed in two sections connected at their adjacent ends for pivotal movement from a position where they are substantially aligned to a second position where the sections are disposed at substantially right angles, a spring normally maintaining the sections in the first named position, a pivotal mounting for the arm engaging the free end of one of the sections thereof, a stop engaging said section and limiting rotation of the arm upon its mounting after a predetermined movement thereof and means for rotating the arm operative when rotation of the arm is checked by the stop to move the sections of the arm from the first to the second named position against the action of the spring.

2. A signal of the type described comprising an arm formed in two sections connected at their adjacent ends for pivotal movement from a position where they are substantially aligned to a second position where the sections are disposed at substantially right angles, a spring normally maintaining the sections in the first named position, a pivotal mounting for the arm engaging the free end of one of the sections thereof, a stop engaging said section and limiting rotation of the arm upon its mounting after a predetermined movement thereof, means for rotating the arm operative when rotation of the arm is checked by the stop to move the sections of the arm from the first to the second named position against the action of the spring, comprising a rotatable element, a lever secured thereto and a link connecting said lever and the other of the sections of the arm.

3. A signal of the type described comprising an arm formed in two sections connected at their adjacent ends for pivotal movement from a position where they are substantially aligned to a second position where the sections are disposed at substantially right angles, a spring normally maintaining the sections in the first named position, a pivotal mounting for the arm engaging the free end of one of the sections thereof, a stop engaging said section and limiting rotation of the arm upon its mounting after a predetermined movement thereof, means for rotating the arm operative when rotation of the arm is checked by the stop to move the sections of the arm from the first to the second named position against the action of the spring, comprising a rotatable element, a lever secured thereto and a link connecting said lever and the other of the sections of the arm, said spring being connected between said lever and the first named section of the arm.

4. A signal of the type described comprising an arm formed in two sections connected at their adjacent ends for pivotal movement from a position where they are substantially aligned to a second position where the sections are disposed at substantially right angles, a spring normally maintaining the sections in the first named position, a pivotal mounting for the arm engaging the free end of one of the sections thereof, a stop engaging said section and limiting rotation of the arm upon its mounting after a predetermined movement thereof, means for rotating the arm operative when rotation of the arm is checked by the stop to move the sections of the arm from the first to the second named position against the action of the spring, comprising a rotatable element, a lever secured thereto and a link connecting said lever and the other of the sections of the arm, the rotatable element having an axial prolongation providing the pivotal mounting for the arm.

5. A signal of the type described comprising an arm formed in two sections connected at their adjacent ends for pivotal movement from a position where they are substantially aligned to a second position where the sections are disposed at substantially right angles, a spring normally maintaining the sections in the first named position, a pivotal mounting for the arm engaging the free end of one of the sections thereof, a stop engaging said section and limiting rotation of the arm upon its mounting after a predetermined movement thereof, means for rotating the arm operative when rotation of the arm is checked by the stop to move the sections of the arm from the first to the second named position against the action of the spring, comprising a rotatable element, a lever secured thereto and a link connecting said lever and the other of the sections of the arm, said spring being connected between said lever and the first named section of the arm, the rotatable element having an axial prolongation providing the pivotal movement for the arm.

6. A signal of the type described comprising an arm formed in two sections connected at their adjacent ends for pivotal movement from a position where they are substantially aligned to a second position where the sections are disposed at substantially right angles, a spring normally maintaining the sections in the first named position, a pivotal mounting for the arm engaging the free end of one of the sections thereof, a stop engaging said section and limiting rotation of the arm upon its mounting after a predetermined movement thereof, means for rotating the arm operative when rotation of the arm is checked by the stop to move the sections of the arm from the first to the second named position against the action of the spring and means for latching the last named means with the arm in engagement with said stop and the sections thereof aligned or the arm in engagement with said stop and the sections thereof at right angles to one another.

7. A signal of the type described comprising an arm formed in two sections connected at their adjacent ends for pivotal movement from a position where they are substantially aligned to a second position where the sections are disposed at substantially right angles, a spring normally maintaining the sections in the first named position, a pivotal mounting for the arm engaging the free end of one of the sections thereof, a stop engaging said sections and limiting rotation of the arm upon its mounting after a predetermined movement thereof, means for rotating the arm operative when rotation of the arm is checked by the stop to move the sections of the arm from the first to the second named position against the action of the spring and means for latching the last named means with the arm in engagement with said stop and the sections thereof aligned or the arm in engagement with said stop and the sections thereof at right angles to one another, said arm normally depending from said pivotal mounting and extending horizontally therefrom when the arm is in engagement with the stop, the latch including a resilient element deflectable upon the application of pressure thereto to release the means for rotating the arm and permit the arm to return to its normal position.

8. A semaphore signal made in the semblance of a human arm and formed in two sections connected at their adjacent ends for pivotal movement from a position where they are substantially aligned to a second position where the sections are disposed at right angles to one another, a rotatable operating element for the arm including an axial prolongation directed through the shoulder of the upper arm section, a lever secured to said operating member intermediate its ends, a spring connecting one end of the lever and the upper arm section, a link connecting the opposite end of the lever and the forearm section of the lever and a stop for engaging the upper arm section of the lever when horizontally disposed to limit rotation thereof and thereby permit said lever and link to cause relative rotation of the sections from the first to the second named position against the action of said spring.

In testimony whereof I hereunto affix my signature.

EDWIN R. LINEHAN.